(12) United States Patent
Albero et al.

(10) Patent No.: US 12,481,733 B2
(45) Date of Patent: Nov. 25, 2025

(54) ENTITY AUTHENTICATOR IN AUGMENTED OR VIRTUAL REALITY COMPUTING ENVIRONMENTS

(71) Applicant: BANK OF AMERICA CORPORATION, Charlotte, NC (US)

(72) Inventors: George Anthony Albero, Charlotte, NC (US); Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 417 days.

(21) Appl. No.: 17/988,363

(22) Filed: Nov. 16, 2022

(65) Prior Publication Data
US 2024/0160704 A1   May 16, 2024

(51) Int. Cl.
*G06F 21/16* (2013.01)
*G06F 21/31* (2013.01)
*G06F 21/64* (2013.01)

(52) U.S. Cl.
CPC .............. *G06F 21/16* (2013.01); *G06F 21/31* (2013.01); *G06F 21/64* (2013.01)

(58) Field of Classification Search
CPC .......... G06F 21/16; G06F 21/31; G06F 21/64; G06Q 2220/00; H04L 9/3239
See application file for complete search history.

(56) References Cited

U.S. PATENT DOCUMENTS

| | | | |
|---|---|---|---|
| 6,671,818 B1 * | 12/2003 | Mikurak | H04L 63/08 |
| | | | 714/48 |
| 8,140,340 B2 | 3/2012 | Bhogal et al. | |
| 8,245,283 B2 | 8/2012 | Dawson et al. | |
| 9,087,399 B2 | 7/2015 | Shuster et al. | |
| 9,280,871 B2 | 3/2016 | Bailey et al. | |
| 9,818,228 B2 | 11/2017 | Lanier et al. | |
| 10,311,223 B2 | 6/2019 | Adams et al. | |
| 10,482,228 B2 | 11/2019 | Welsh et al. | |
| 10,915,904 B2 | 2/2021 | Conway | |
| 11,044,281 B2 | 6/2021 | Pilnock et al. | |
| 11,223,378 B2 | 1/2022 | Toi | |
| 11,301,912 B2 | 4/2022 | Gadre et al. | |
| 11,461,582 B2 * | 10/2022 | Jordan | G06F 18/214 |
| 11,494,833 B2 | 11/2022 | Gadre et al. | |
| 11,616,999 B1 * | 3/2023 | Borawski | H04N 21/44204 |
| | | | 725/9 |
| 11,856,146 B2 * | 12/2023 | Jorasch | H04N 21/4781 |

(Continued)

*Primary Examiner* — Hosuk Song
(74) *Attorney, Agent, or Firm* — Moore & Van Allen PLLC; Anup Iyer

(57) ABSTRACT

Authentication/verification of sub-environments that represent entities within an augmented/virtual reality computing network and virtual objects present in the sub-environment that represent individuals associated with the entity. In response to authentication, a sensory-perceptible indicator (e.g., visual, audible or haptic indicators) is presented to users of the virtual reality computing environment that notify the user that the entity or virtual objects representing the entity have been authenticated. Authentication may be performed via watermarks embedded in images present within the sub-environment, capturing and comparing physical characteristics of an authorized individual representing the entity, cryptographic frequency hopping and/or electromagnetic signatures.

17 Claims, 4 Drawing Sheets

(56) References Cited

U.S. PATENT DOCUMENTS

| | | | |
|---|---|---|---|
| 11,917,253 B2* | 2/2024 | Ly | H04N 21/25891 |
| 11,977,962 B2* | 5/2024 | Cheruvu | G06F 9/30101 |
| 2012/0089410 A1* | 4/2012 | Mikurak | G06Q 10/00 705/1.1 |
| 2016/0092877 A1 | 3/2016 | Chew | |
| 2017/0324726 A1 | 11/2017 | Alleaume et al. | |
| 2018/0144112 A1 | 5/2018 | Pitel et al. | |
| 2020/0070051 A1 | 3/2020 | Frappiea | |
| 2020/0143345 A1 | 5/2020 | Adams et al. | |
| 2020/0167775 A1 | 5/2020 | Reese et al. | |
| 2021/0118085 A1 | 4/2021 | Bushnell et al. | |
| 2021/0273944 A1 | 9/2021 | Sundar | |

* cited by examiner

ENTITY AUTHENTICATOR IN AUGMENTED OR VIRTUAL REALITY COMPUTING ENVIRONMENTS

FIELD OF THE INVENTION

The present invention is related generally to computing network security and, more specifically, systems and methods for authenticating entities and virtual objects representing entities in augmented and/or virtual reality computing environments, such as metaverses.

BACKGROUND

The use of augmented and/or virtual reality computing environments (collectively referred to herein as "virtual reality computing environments) have become increasing more prevalent. By way of example, Metaverse is a hypothetical iteration of the Internet as a single, universal and immersive virtual reality computing environment that is facilitated by the use of virtual reality and augmented reality headsets. Thus, Metaverse provides the ability for a user to associate with an avatar (i.e., a virtual representation/object of the user) and for the avatar to conduct resource exchange events within a virtual environment. While the resource exchange event is initiated entirely within the virtual environment, it results in an actual exchange of resources between the user and the resource-providing entity.

Such virtual environment-based resource exchange events pose security threats. Specifically, resource-providing entities in Metaverse or other virtual reality computing environments may not be who they purport to be (i.e., nefarious entities masquerading as the intended resource providing entity. Since the resource exchange event is occurring in a virtual environment, the measures that need to be taken to address such security threats may be different than those taken to address non-virtual (e.g., physical or online) resource exchange events.

Therefore, a need exists to develop systems, methods, computer program products and the like which provide security to resource exchange events that occur in a virtual reality computing environment, such as Metaverse or the like. In this regard, the desired systems, methods and the like should provide verification/authentication of (i) resource-providing entities (i.e., non-human entities) that typically occupy a region/zone/sub-verse of the virtual reality computing environment (referred to herein as a "sub-environment") and (ii) the virtual objects (e.g., avatars or the like) representing the resource-providing entity that current occupy the sub-environment. In this regard, the desired systems, methods and the like should serve to verify that the resource-providing entities are who they purport to be and that the virtual objects/avatars representing the resource providing entities that are currently residing in the entity's sub-environment are, in fact, representatives of the resource-providing entity.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for authentication/verification of (i) entities, i.e., non-human entities within a virtual reality computing environment, such as Metaverse or the like and (ii) the virtual objects representing the entities. In addition, once the entities and/or virtual objects have been authenticated, the present invention provides for presenting sensory-perceptible indicators (e.g., visual, audible or haptic indicators) to users of the virtual reality computing environment that notify the user that the entity or virtual objects representing the entity have been authenticated (i.e., verified as being the entity or representing the entity).

In virtual reality computing environments, non-human entities (e.g., resource-providing entities or the like) typically exist as regions/zones/sub-verses within the virtual reality computing environment and, as such, are referred to herein as sub-environments. Thus, the present invention provides for authenticating the sub-environments that represent the non-human entities and the virtual objects representing the entity that reside in the sub-environments.

In specific embodiments of the invention, the authentication of the sub-environments representing the entities and/or the virtual objects representing the entity that reside in the sub-environments is performed by embedding a watermark in an image, such as an entity's logo or the like, displayed within the sub-environment or on or proximate to the virtual object(s). The embedded watermark is communicated to an authentication entity that verifies that the watermark is currently associated with the sub-environment or the virtual object. In specific embodiments of the invention the watermark is visible and the authentication entity is the user of the virtual reality computing environment, such that the watermark is sent to the user who compares the watermark in the image to the received watermark for purposes of authentication. In specific embodiments of the invention, as a means of thwarting a wrongdoer from attempting to copy/use the watermark and impersonating the entity with the virtual reality computing environment, the watermark continuously changes on a predetermined interval (e.g., once every minute or the like) and, in response to changing, the watermark is communicated to the authenticating entity for verification that the changed watermark is currently associated with the sub-environment or the virtual object. In additional embodiments of the invention, random steganography is generated and embedded in the watermark as a further means of preventing a wrongdoer from copying/using the watermark and impersonating the entity with the virtual reality computing environment.

In other specific embodiments of the invention, the authentication of the sub-environments representing the entities and/or the virtual objects representing the entity that reside in the sub-environments is performed by capturing physical characteristics of an individual associated with the entity and authorized by the entity to represent the entity and comparing the captured physical characteristic data to verified physical characteristic data associated with the individual. In related embodiments of the invention, the physical characteristics are continuously captured throughout a user's virtual reality computing environment session, so that the captured physical characteristics are continuously being compared to the verified physical characteristic data associated with the individual so as to ensure authentication/ verification of the sub-environment representing the entity and/or the virtual objects residing in the sub-environment throughout a user's session.

In other embodiments of the invention, the authentication of the sub-environments representing the entities and/or the virtual objects representing the entity that reside in the sub-environments is performed by assigning cryptographic frequency hopping signals between the user and one or more of the sub-environments and/or the one or more of the virtual objects in the one or more of the sub-environments. While in other specific embodiments of the invention, the authentication of the sub-environments representing the entities and/or the virtual objects representing the entity that reside in the sub-environments is performed by generating an electromagnetic signature associated with at least one of the sub-environments and/or virtual objects in the one or more of the sub-environments and communicating the electromagnetic signature to the user. In turn, the user accesses a database that stores verified electromagnetic signatures associated with at least one of the sub-environments and the virtual objects in the sub-environment to compare the electromagnetic signature to the verified electromagnetic signatures stored in the database.

A system for providing authentication in a virtual reality computing environment defines first embodiments of the invention. The system includes a computing platform having a memory and one or more computing processor devices in communication with the memory. The memory stores a virtual reality application that is executable by at least one of the one or more computing processor devices. The virtual reality application is configured to present a virtual reality computing environment that includes at least one sub-environment representing a corresponding non-human entity and one or more virtual objects in the least one sub-environment. Each virtual object representing a corresponding first individual associated with the corresponding entity. The memory of the computing platform additionally includes an authentication application that is executable by at least one of the one or more computing processor devices. The authentication application is configured to authenticate at least one of (i) one or more of the sub-environments, and (ii) one or more of the virtual objects in the one or more of the sub-environments. In response to authenticating the at least one of the one or more of the sub-environments and the one or more of the virtual objects in the one or more of the sub-environments, present one or more first sensory-perceptible indicators that signify to a user of the virtual reality application that at least one of (i) the one or more of the sub-environments are authenticated as representing the entity, and (ii) one or more of the virtual objects in the one or more of the sub-environments are authenticated as representing a corresponding first individual associated with the entity.

In specific embodiments of the system, the authentication application is further configured to authenticate the at least one of (i) the one or more of the sub-environments and (ii) the one or more of the virtual objects in the one or more of the sub-environments by embedding a watermark in an image, such as a logo or the like, displayed (i) within the one or more of the sub-environments, or (ii) on or proximate to the one or more virtual objects, and communicating the watermark to an authenticating entity that verifies that the watermark is currently associated with a corresponding sub-environment or a corresponding virtual object in the one or more of the sub-environments. In such embodiments of the system, the authentication application may be further configured to authenticate by continuously changing the watermark in the image on a predetermined schedule, and, in response to changing the watermark, communicating the changed watermark to the authenticating entity that verifies that the changed watermark is currently associated with a corresponding sub-environment or a corresponding virtual object in the one or more of the sub-environments. In other related embodiments of the system, the watermark is visually-perceptible by the user, and the authenticating entity is the user. In still further embodiments of the system, the authentication application includes a steganography generator configured to generate random steganography and embed the random steganography in the watermark.

In other specific embodiments of the invention, the authentication application is further configured to authenticate the at least one of (i) the one or more of the sub-environments and (ii) the one or more of the virtual objects in the one or more of the sub-environments by capturing physical characteristic data from at least one of (i) a second individual authorized to represent the entity or (ii) the first individual associated with the entity as represented by a corresponding one of the virtual objects, and comparing the captured physical characteristic data to verified physical characteristic data associated with the second individual or the first individual. In related embodiments of the system, the authentication application is further configured to authenticate the at least one of (i) the one or more of the sub-environments and (ii) the one or more of the virtual objects in the one or more of the sub-environments by continuously capturing, throughout a user's virtual reality session, physical characteristic data from at least one of (i) a second individual authorized to represent the entity or (ii) the first individual associated with the entity as represented by a corresponding one of the virtual objects, and conduct continuous comparisons of the captured physical characteristic data to the verified physical characteristic data associated with the second individual or the first individual to ensure authentication throughout the user's virtual reality session.

In still further specific embodiments of the system, the authentication application is further configured to authenticate the at least one of (i) the one or more of the sub-environments and (ii) the one or more of the virtual objects in the one or more of the sub-environments by assigning cryptographic frequency hopping signals between the one or more of the sub-environments or the one or more of the virtual objects in the one or more of the sub-environments and the user.

In other specific embodiments of the system, the authentication application is further configured to authenticate the at least one of (i) the one or more of the sub-environments and (ii) the one or more of the virtual objects in the one or more of the sub-environments by generating an electromagnetic signature associated with at least one of (i) the one or more of the sub-environments and (ii) the one or more of the virtual objects in the one or more of the sub-environments, and communicating the electromagnetic signature to the user, wherein the user accesses a database that stores verified electromagnetic signatures associated with at least one of the sub-environments and the virtual objects in the sub-environment to compare the electromagnetic signature to the verified electromagnetic signatures stored in the database.

In other specific embodiments of the system, the authentication application is further configured to, in response to the user interacting with one of the sub-environments that has not been authenticated or a virtual object in one of the sub-environments that has not been authenticated, present one or more second sensory-perceptible indicators that signify to a user at least one of (i) that the one of the sub-environments has not been authenticated, and (ii) that the virtual object in the one of the sub-environments has not been authenticated.

In still further specific embodiments of the system, the authentication application is further configured to communicate an authentication indicator to other users of the virtual reality computing environment that are associated with the user> In such embodiments of the system, the authentication indicator serves to provide authentication to the other users, for a predetermined time period, that at least one of (i) the one or more of the sub-environments are authenticated as representing the entity, and (ii) one or more of the virtual objects in the one or more of the sub-environments are authenticated as representing a corresponding first individual associated with the entity.

A computer-implemented method for providing authentication in a virtual reality computing environment defines second embodiments of the invention. The method is executed by one or more computing processor devices and includes presenting a virtual reality computing environment that includes (i) at least one sub-environment representing a corresponding entity that is non-human and (ii) one or more virtual objects in the least one sub-environment, each virtual object representing a corresponding first individual associated with the corresponding entity. The method further includes authenticating at least one of (i) one or more of the sub-environments and (ii) one or more of the virtual objects in the one or more of the sub-environments, and, in response to authenticating the at least one of (i) the one or more of the sub-environments and (ii) the one or more of the virtual objects in the one or more of the sub-environments, presenting one or more first sensory-perceptible indicators that signify to a user of the virtual reality computing environment that at least one of (i) the one or more of the sub-environments are authenticated as representing the entity, and (ii) one or more of the virtual objects in the one or more of the sub-environments are authenticated as representing a corresponding first individual associated with the entity.

In further specific embodiments of the computer-implemented method, authenticating the at least one of (i) the one or more of the sub-environments and (ii) the one or more of the virtual objects in the one or more of the sub-environments further includes embedding a watermark in an image displayed (i) within the one or more of the sub-environments, or (ii) on or proximate to the one or more virtual objects, and communicating the watermark to an authenticating entity that verifies that the watermark is currently associated with a corresponding sub-environment or a corresponding virtual object in the one or more of the sub-environments. In related embodiments of the computer-program product, authentication further includes continuously changing the watermark in the image on a predetermined schedule, and, in response to changing the watermark, communicating the changed watermark to the authenticating entity that verifies that the changed watermark is currently associated with a corresponding sub-environment or a corresponding virtual object in the one or more of the sub-environments.

In other specific embodiments of the computer-implemented method, authenticating the at least one of (i) the one or more of the sub-environments and (ii) the one or more of the virtual objects in the one or more of the sub-environments further includes capturing physical characteristic data from at least one of (i) a second individual authorized to represent the entity or (ii) the first individual associated with the entity as represented by a corresponding one of the virtual objects, and comparing the captured physical characteristic data to verified physical characteristic data associated with the second individual or the first individual.

A computer program product defines third embodiments of the invention. The computer program product includes a non-transitory computer-readable medium having sets of codes. The sets of codes cause one or more computing processing devices to present a virtual reality computing environment that includes (i) at least one sub-environment representing a corresponding entity that is non-human and (ii) one or more virtual objects in the least one sub-environment, each virtual object representing a corresponding first individual associated with the corresponding entity. The sets of codes further cause the computing processing device(s) to authenticate at least one of (i) one or more of the sub-environments and (ii) one or more of the virtual objects in the one or more of the sub-environments. In response to authenticating the at least one of (i) the one or more of the sub-environments and (ii) the one or more of the virtual objects in the one or more of the sub-environments, the sets of codes further cause the computing processing device(s) to present one or more first sensory-perceptible indicators that signify to a user of the virtual reality computing environment that at least one of (i) the one or more of the sub-environments are authenticated as representing the entity, and (ii) one or more of the virtual objects in the one or more of the sub-environments are authenticated as representing a corresponding first individual associated with the entity.

In specific embodiments of the computer program product, the set of codes for causing the one or more computing processing devices to authenticate the at least one of (i) the one or more of the sub-environments and (ii) the one or more of the virtual objects in the one or more of the sub-environments further cause the one or more computing processing devices to embed a watermark in an image displayed (i) within the one or more of the sub-environments, or (ii) on or proximate to the one or more virtual objects, and communicate the watermark to an authenticating entity that verifies that the watermark is currently associated with a corresponding sub-environment or a corresponding virtual object in the one or more of the sub-environments. In related embodiments of the computer program product, the set of codes for causing the one or more computing processing devices to authenticate the at least one of (i) the one or more of the sub-environments and (ii) the one or more of the virtual objects in the one or more of the sub-environments further cause the one or more computing processing devices to continuously change the watermark in the image on a predetermined schedule, and, in response to changing the watermark, communicate the changed watermark to the authenticating entity that verifies that the changed watermark is currently associated with a corresponding sub-environment or a corresponding virtual object in the one or more of the sub-environments.

In other specific embodiments of the computer program product, the set of codes for causing the one or more computing processing devices to authenticate the at least one of (i) the one or more of the sub-environments and (ii) the one or more of the virtual objects in the one or more of the sub-environments further cause the one or more computing processing devices to capture physical characteristic data from at least one of (i) a second individual authorized to represent the entity or (ii) the first individual associated with the entity as represented by a corresponding one of the virtual objects, and compare the captured physical characteristic data to verified physical characteristic data associated with the second individual or the first individual.

Thus, according to embodiments of the invention, which will be discussed in greater detail below, the present invention provides for authentication/verification of sub-environments that represent entities within an augmented/virtual reality computing network and virtual objects present in the sub-environments that represent individuals associated with the entity. In response to authentication, a sensory-perceptible indicator (e.g., visual, audible or haptic indicators) is presented to users of the virtual reality computing environment that notify the user that the entity or virtual objects representing the entity have been authenticated. Authentication may be performed via watermarks embedded in images present within the sub-environment, capturing and comparing physical characteristics of an authorized individual representing the entity, cryptographic frequency hopping and/or electromagnetic signatures.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
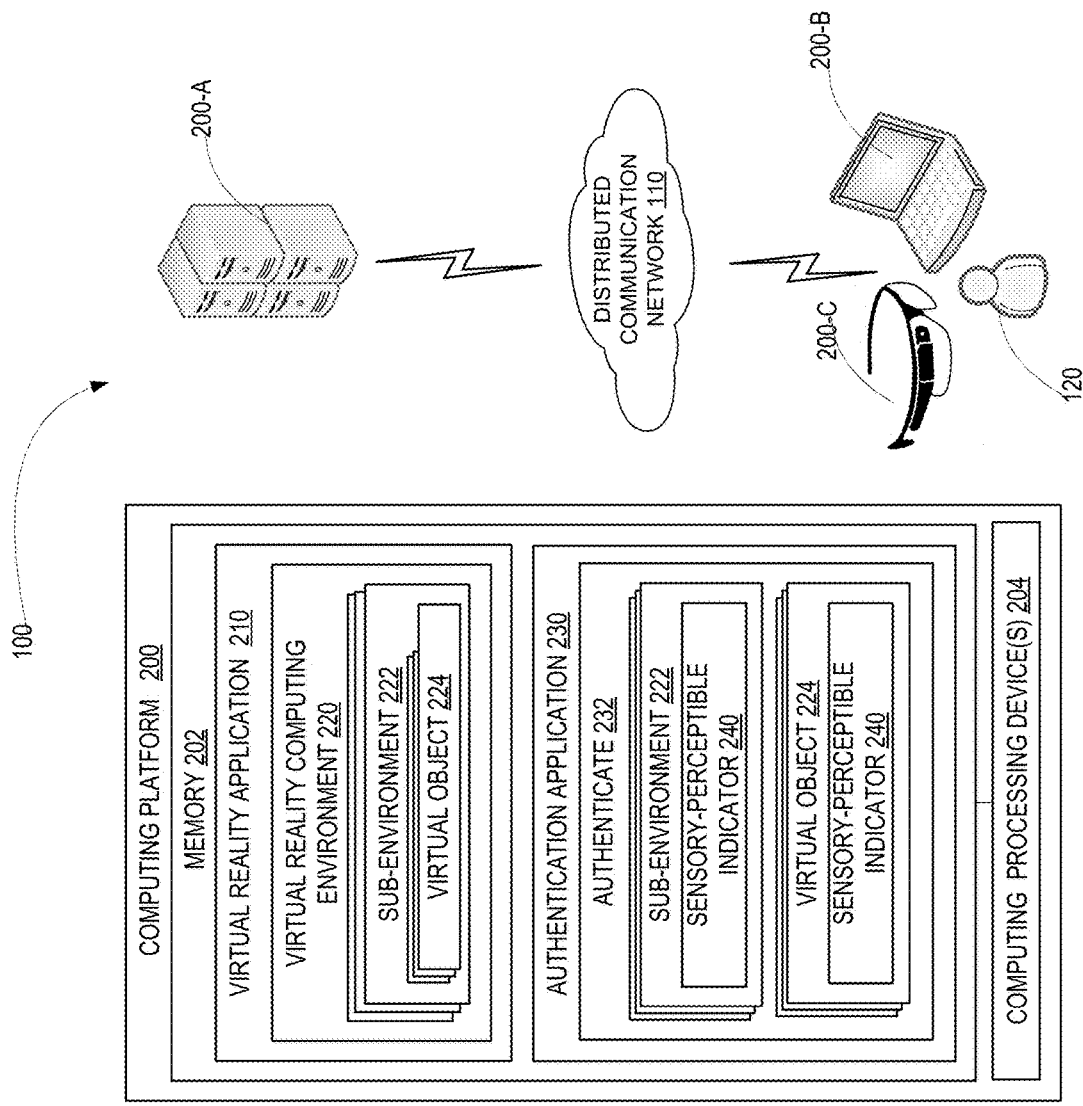
Figure 2:
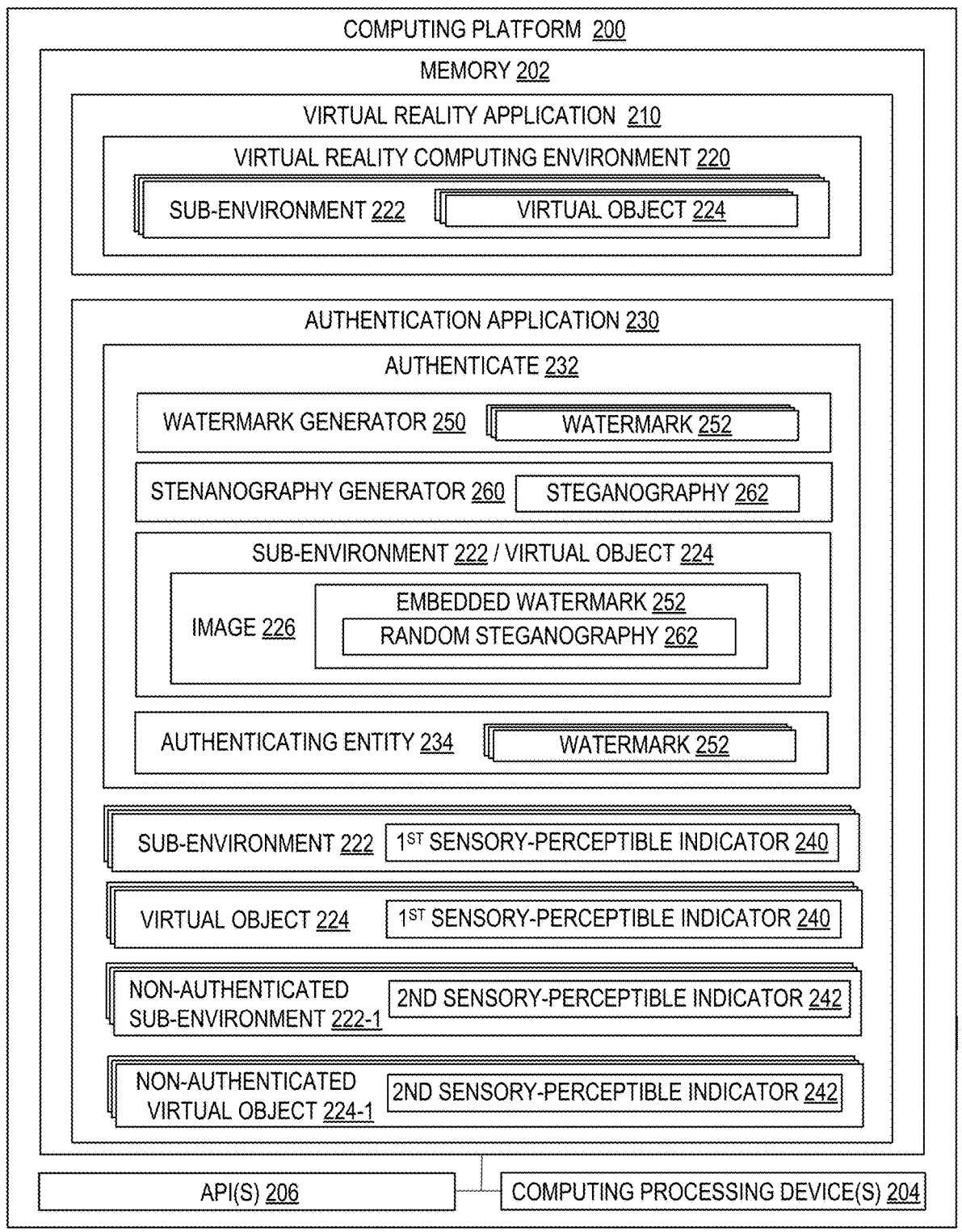
Figure 3:
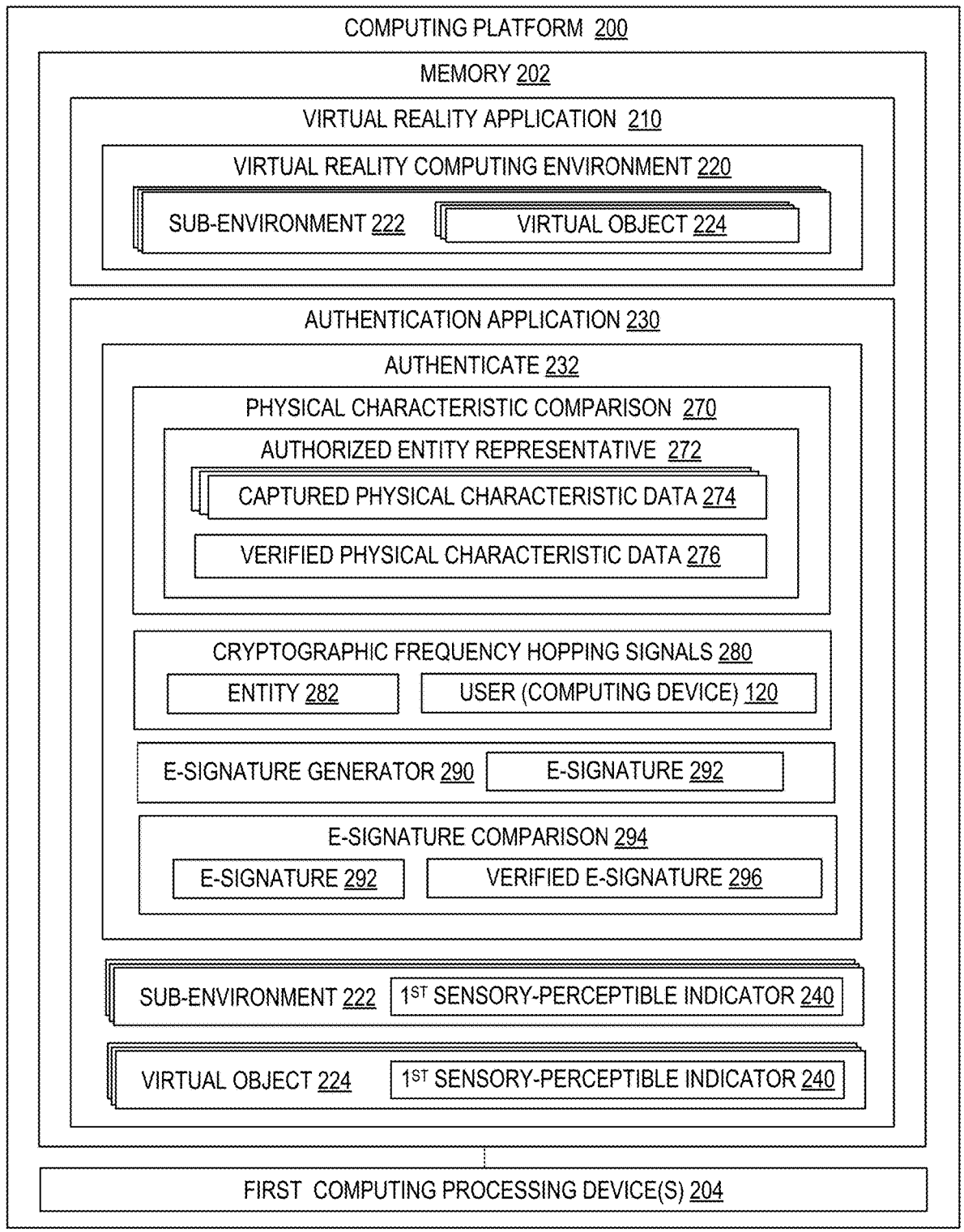
Figure 4:
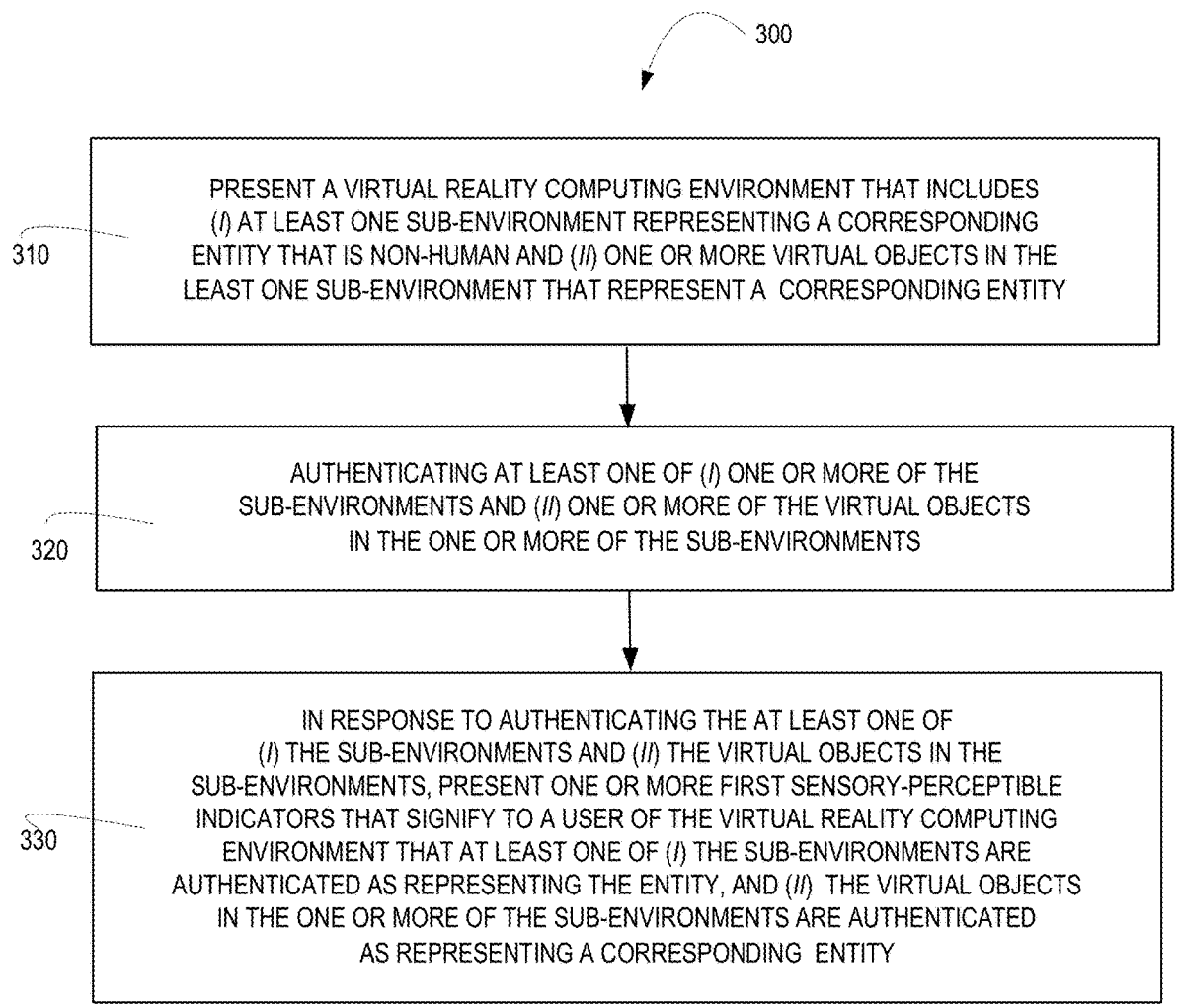

Having thus described embodiments of the disclosure in general terms, reference will now be made to the accompanying drawings, wherein:

FIG. 1 is a schematic/block diagram of system for authenticating sub-environments representing entities and/or virtual objects in the sub-environments representing individuals associated with the entities in a virtual reality computing environment, in accordance with embodiments of the present invention;

FIGS. 2 and 3 are block diagrams of computing platform including a virtual reality application and an authentication application, in accordance with embodiments of the present invention; and FIG. 4 is a flow diagram of a method for authenticating sub-environments representing entities and/or virtual objects in the sub-environments representing individuals associated with the entities in a virtual reality computing environment, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

As used herein, "virtual reality computing environment", which includes augmented reality computing environments, such as Metaverse or the like may refer to a collection of persistent, shared, three-dimensional virtual spaces linked into a perceived virtual universe. In some embodiments, a virtual reality computing environment may not only refer to virtual worlds, but the Internet as a whole, including the spectrum of augmented reality. A virtual reality computing environment may include a number of different elements such as video conferencing, digital currencies, virtual reality platforms, social media, live data streaming, digital representations of real-life objects and/or the like. In some embodiments, a virtual reality computing environment may include virtual properties, such as virtual land parcels and estates for users to create and build-on, or structures that reflect real-life properties and/or completely original creations. These spaces may be represented by co-ordinates on the metaverse platform where users can meet up using their avatars (i.e., virtual objects) to socialize and decorate their own spaces with collectibles. Any combination of the aforementioned elements may form a computer-mediated virtual environment, i.e., a virtual world, within the metaverse. Within this self-sustaining, persistent, and shared realm, users may exist and interact with each other using their digital avatars (i.e., virtual objects).

Further, as used herein, a "sub-environment" within a virtual reality computing environment refers to a specific zone, region, sub-verse or location within the overall environment, which has virtual boundaries. The "sub-environment" represents a corresponding entity, which is characteristically a non-human entity, such as an organization, a business, e.g., a resource-providing entity or the like. For example, the entity may be a financial institution, a retailer or the like.

Thus, according to embodiments of the invention, which will be described in more detail below, systems, methods and computer program products are disclosed that for authentication/verification of (i) entities, i.e., non-human entities within a virtual reality computing environment, such as Metaverse or the like, and (ii) the virtual objects representing the entities. In addition, once the entities and/or virtual objects have been authenticated, the present invention provides for presenting sensory-perceptible indicators (e.g., visual, audible or haptic indicators) to users of the virtual reality computing environment that notify the user that the entity or virtual objects representing the entity have been authenticated (i.e., verified as being the entity or representing the entity). In virtual reality computing environments, non-human entities (e.g., resource-providing entities or the like) typically exist as regions/zones/sub-verses/bounded locations within the virtual reality computing environment and, as such, are referred to herein as "sub-environments". Thus, the present invention provides for authenticating the sub-environments that represent the non-human entities and the virtual objects representing the entity that reside in the sub-environments.

In specific embodiments of the invention, the authentication of the sub-environments representing the entities and/or the virtual objects representing the entity that reside in the sub-environments is performed by embedding a watermark in an image, such as an entity's logo or the like, displayed within the sub-environment or on or proximate to the virtual object(s). The embedded watermark is communicated to an authentication entity that verifies that the watermark is currently associated with the sub-environment or the virtual object. In specific embodiments of the invention the watermark is visible and the authentication entity is the user of the virtual reality computing environment, such that the watermark is sent to the user who compares the watermark in the image to the received watermark for purposes of authentication. In specific embodiments of the invention, as a means of thwarting a wrongdoer from attempting to copy/use the watermark and impersonating the entity with the virtual reality computing environment, the watermark continuously changes on a predetermined interval (e.g., once every minute or the like) and, in response to changing, the watermark is communicated to the authenticating entity for verification that the changed watermark is currently associated with the sub-environment or the virtual object. In additional embodiments of the invention, random steganography is generated and embedded in the watermark as a further means of preventing a wrongdoer from copying/using the watermark and impersonating the entity with the virtual reality computing environment.

In other specific embodiments of the invention, the authentication of the sub-environments representing the entities and/or the virtual objects representing the entity that reside in the sub-environments is performed by capturing physical characteristics of an individual associated with the entity and authorized by the entity to represent the entity and comparing the captured physical characteristic data to verified physical characteristic data associated with the individual. In related embodiments of the invention, the physical characteristics are continuously captured throughout a user's virtual reality computing environment session, so that the captured physical characteristics are continuously being compared to the verified physical characteristic data associated with the individual so as to ensure authentication/verification of the sub-environment representing the entity and/or the virtual objects residing in the sub-environment throughout a user's session.

In other embodiments of the invention, the authentication of the sub-environments representing the entities and/or the virtual objects representing the entity that reside in the sub-environments is performed by assigning cryptographic frequency hopping signals between the user and one or more of the sub-environments and/or the one or more of the virtual objects in the one or more of the sub-environments. While in other specific embodiments of the invention, the authentication of the sub-environments representing the entities and/or the virtual objects representing the entity that reside in the sub-environments is performed by generating an electromagnetic signature associated with at least one of the sub-environments and/or virtual objects in the one or more of the sub-environments and communicating the electromagnetic signature to the user. In turn, the user accesses a database that stores verified electromagnetic signatures associated with at least one of the sub-environments and the virtual objects in the sub-environment to compare the electromagnetic signature to the verified electromagnetic signatures stored in the database.

Referring to FIG. 1, a schematic/block diagram is presented of a system 100 for authentication in a virtual reality computing environment in accordance with embodiments of the invention. The system 100 is implemented within a distributed communication network 110, which may include the Internet, one or more intranets, one or more cellular networks or the like. The system 100 includes a computing platform 200 which may comprise network-based component(s), such as application server 200-A, user-based component(s) associated with a virtual reality computing environment user 120, such as laptop computing apparatus 200-B or augmented/virtual reality headset 200-C or a combination of network-based components and user-based components. Computing platform 200 includes a memory 202 and one or more computing processing devices 204 in communication with memory 202. Memory 202 stores virtual reality application 210, which is executable by at least one of the one or more computing processor devices 204. As previous discussed for purposes of the present invention the phrase "virtual reality" includes the Metaverse, augmented reality and any other simulated human-like experience.

Virtual reality application 200 is configured to present, to user 120, a virtual reality computing environment 220 that includes at least one, and typically a plurality of, sub-environment(s) 222 representing a corresponding entity that is non-human. For example, the entity may be an organization, a business or the like. As previously discussed, a sub-environment 222 is a region, zone or sub-verse with the overall virtual reality computing environment 220 having virtual boundaries. In addition, virtual reality computing environment 220 includes one or more virtual objects 224 (e.g., avatars) in the least one sub-environment, each virtual object 224 representing a corresponding first individual associated with the corresponding entity (i.e., a representative of the entity).

Memory 201 additionally stores authentication application 230 that is executable by at least one of the one or more computing processing devices 204. Authentication application 230 is configured to authenticate 232 authenticate at least one of (i) one or more of the sub-environments 222 and (ii) one or more of the virtual objects 224 in the one or more of the sub-environments 222. Authenticate 232, as used herein, means that the sub-environment and the virtual object are verified as representing the purported entity.

In response to authenticating the at least one of the one or more of the sub-environments 222 and/or the one or more of the virtual objects 224 in the one or more of the sub-environments 222, authentication application 230 is further configured to present one or more first sensory-perceptible indicators 240 that signify to user 120 of the virtual reality application 210 that at least one of (i) the one or more of the sub-environments 22 are authenticated as representing the entity, and (ii) one or more of the virtual objects 224 in the one or more of the sub-environments 222 are authenticated as representing a corresponding first individual associated with the entity. In specific embodiment of the invention, the first sensory-perceptible indicators 240 may be visual indicators provided within the sub-environment 222 or on or proximate to the virtual object 224. In other embodiments of the invention, the first sensory-perceptible indicators 240 may be audible indicator that provide an audible signal when user 120 (i.e., the visual object/avatar associated with user 120) enters the sub-environment 222 or comes in close contact (e.g., within a predetermined range) of the virtual object 224. In other embodiments of the invention, first sensory-perceptible indicators 240 may be a haptic indicator, such as vibration provided to the virtual reality headset 200-C or a hand-held control unit or mouse device used for navigating the virtual reality computing environment 220.

Referring to a FIGS. 2 and 3, block diagrams are presented of computing platform 200, in accordance with embodiments of the present invention. In addition to providing greater details of authentication application 230, FIGS. 2 and 3 highlight various alternate embodiments of the invention. Computing platform 200 may comprise one or multiple devices, such as servers, laptops, virtual reality devices or the like. Computing platform 200 includes memory 202, which may comprise volatile and/or non-volatile memory, such as read-only and/or random-access memory (RAM and ROM), EPROM, EEPROM, flash cards, or any memory common to computing platforms). Moreover, memory 202 may comprise cloud storage, such as provided by a cloud storage service and/or a cloud connection service.

Further, computing platform 200 includes one or more first computing processing devices 204, which may be an application-specific integrated circuit ("ASIC"), or other chipset, logic circuit, or other data processing device. Computing processing device(s) 204 may execute one or more application programming interface (APIs) 206 that interface with any resident programs, such as virtual reality application 210 and authentication application 230 or the like, stored in memory 202 of computing platform 200 and any external programs. Computing processing devices(s) 204 may include various processing subsystems (not shown in FIGS. 2 and 3) embodied in hardware, firmware, software, and combinations thereof, that enable the functionality of computing platform 200 and the operability of computing platform 200 on a distributed communication network 110 (shown in FIG. 1), such as the Intranet, intranet(s), cellular network(s) and the like. For example, processing subsystems allow for initiating and maintaining communications and exchanging data with other networked devices. For the disclosed aspects, processing subsystems of computing platform 200 may include any subsystem used in conjunction with virtual reality application 210 and authentication application 230 and related tools, routines, sub-routines, algorithms, sub-algorithms, sub-modules thereof.

In specific embodiments of the present invention, computing platform 200 additionally includes a communications module (not shown in FIGS. 2 and 3) embodied in hardware, firmware, software, and combinations thereof, that enables electronic communications between computing platform 200 and other networks and network devices. Thus, communication module may include the requisite hardware, firmware, software and/or combinations thereof for establishing and maintaining a network communication connection with one or more devices and/or networks.

Memory 202 of first computing platform 200 stores virtual reality application 210, which may be a web-based application or a local-application stored on a user device. As previously discussed in relation to FIG. 1, virtual reality application 210 present, to user 120, a virtual reality computing environment 220 that includes at least one, and typically a plurality of, sub-environment(s) 222 representing a corresponding entity that is non-human. For example, the entity may be an organization, a business or the like. As previously discussed, a sub-environment 222 is a region or zone with the overall virtual reality computing environment 220 having virtual boundaries. In addition, virtual reality computing environment 220 includes one or more virtual objects 224 (e.g., avatars) in the least one sub-environment, each virtual object 224 representing a corresponding first individual associated with the corresponding entity (i.e., a representative of the entity).

Memory 202 additionally stores authentication application 230 that is configured to authenticate 232 at least one of the sub-environment(s) 222 and/or at least one of the virtual objects 224 in the sub-environment 222. As depicted in FIG. 2, in specific embodiments of the invention, authentication 232 is performed via watermark generator 250 that is configured to generate watermark(s) 262 and embed the watermark 252 within an image 226 displayed in the sub-environment 222 or on or proximate to the virtual object 224 in the sub-environment 222. In specific embodiments of the invention, the image 226 is a logo of the entity represented by the sub-environment 222. In such embodiments of the invention, the watermark 252 is communicated to an authenticating entity 234 that verifies that the received watermark 252 is currently the watermark that is associated with a corresponding sub-environment 222 or a corresponding virtual object 224 in the one or more of the sub-environments 222. In specific embodiments of the invention, the watermark 252 is communicated to the authenticating entity 234 via an encrypted channel or the like. In specific embodiments of the invention, the watermark generator 250 authenticating entity implements symmetrically encrypted digital watermarking configured to generate the same watermark 262 at any point-in-time.

In specific embodiments of the invention, in order to prevent against a nefarious entity replicating the watermark 252, watermark generator 250 is configured to generate and change the embedded watermark 252 on a predetermined schedule (e.g., once every 30 seconds, once every minute, or the like). In such embodiments of the invention, the changed/updated watermark 252 is continuously communicated to the authenticating entity to continuously verify that the changed/updated watermark 252 is currently the watermark that is associated with a corresponding sub-environment 222 or a corresponding virtual object 224 in the one or more of the sub-environments 222.

In additionally embodiments of the invention, in order to prevent or further prevent against a nefarious entity replicating the watermark 252, steganography generator 260 may be implemented to generate random steganography 262, such as a random file or the like, which is subsequently embedded within the watermark 252. Similar to the continuous updating/changing of the watermark 252, the random stenography 262 may be continuously updated/changed on a predetermined schedule, which may the same schedule employed by the watermark generator 250 or may be different schedule than the one employed by the watermark generator 250.

In other specific embodiments of the invention, watermark 252 may be a visible watermark or a dual watermark (i.e., a watermark having both visible and invisible markings). In such embodiments of the invention, at least a portion of the authenticating entity 242 may include the user 120, such that the visible watermark 252 is displayed in the image 226 and the watermark is also communicated to the user 120 via a predetermined communication channel (e.g., via email, the virtual reality application 210 or the like). For example, the visible watermark 252 may be displayed in the image 226 and the watermark 252 may simultaneously be displayed elsewhere in the virtual reality application 210, such that user 120 is tasked with visually confirming that the watermarks 252 match as a means of verifying the authenticity of the sub-environment 222 (i.e., authenticity of the entity represented by the sub-environment) and/or authenticity of the virtual object 224 (i.e., authenticity that the virtual object represents the entity).

As depicted in FIG. 3, in specific embodiments of the invention, authentication 232 is performed via physical characteristic comparison 270 in which physical characteristics data 282 is captured from an authorized entity representative 272 and compared against previously verified physical characteristic data 276 of the authorized entity representative 272. The physical characteristic data may include, but is not limited to, facial image data, fingerprint data and the like. Since the physical characteristic data is captured when a user 120 interacts with the sub-environment 222 or the virtual object 224, the authorized entity representative 272 is required to be online or otherwise engaged with the virtual reality application 220 at the same time as the user 120. In specific embodiments of the invention, physical characteristic comparison 270 occurs continuously throughout the user's virtual reality application session. In this regard, physical characteristics data 282 is continuously captured from an authorized entity representative 272 and compared against previously verified physical characteristic data 276 of the authorized entity representative 272 throughout the user's virtual reality application session. For example, image-capturing devices continuously capture the facial image of the authorized entity representative 270 or a control/mouse device continuously capture fingerprint data of the authorized entity representative 270. Similar continuous authentication techniques are disclosed in U.S. patent application Ser. No. 18/054,754, filed on Nov. 11, 2022, entitled "System and Method for Authenticating an Avatar Associated with a User within a Metaverse using Biometric Indicators", which is herein incorporated by reference as if set forth fully herein.

In other specific embodiments of the invention, authentication 232 is performed by cryptographic frequency signal hopping 280, typically signals in the audio spectrum. In such embodiments of the invention, the user 120 and the entity 282 represented by the sub-environment 222 are simultaneously on the same frequency signal, which is set by cryptography. Both the user 120 via the authentication application 230 and the entity 282 possess the encryption/decryption key. The hopping amongst frequencies may occur on a predetermined schedule, such as once every second or the like.

In other specific embodiments of the invention, authentication 232 is performed by e-signature generator 290 that generates an electromagnetic signature (i.e., e-signature) 292 for the entity 282 represented by the sub-environment 222 and communicates the e-signature to the user 120, who, in turn, accesses an e-signature database to verify that the received e-signature is associated with the entity 282.

Is should be noted that any of the authentication techniques described herein (e.g., watermarking, physical characteristic comparison, frequency signal hopping, e-signatures or the like) for performing authentication 232 may be performed individually or in any suitable combination, either in parallel (i.e., simultaneously) or serially.

In other embodiments of the invention, as shown in FIG. 2, authentication application 230 is configured to present second sensory-perceptible indicators 242 in response to the user 120 interacting with/entering a sub-environment 222 that has been or is currently not authenticated or comes in contact with a virtual object 224 that has not been authenticated. The second sensory-perceptible indicators 242 signify to the user 120 at least one of (i) that the one of the sub-environments has not been authenticated, and (ii) that the virtual object in the one of the sub-environments has not been authenticated. Similar to first sensory-perceptible indicators 250, second sensory-perceptible indicators 242 may be configured as visual indicators provided within the sub-environment 222 or on or proximate to the virtual object 224. In other embodiments of the invention, the second sensory-perceptible indicators 242 may be audible indicator that provide an audible signal when user 120 (i.e., the visual object/avatar associated with user 120) enters the sub-environment 222 or comes in close contact (e.g., within a predetermined range) of the virtual object 224. In other embodiments of the invention, second sensory-perceptible indicators 242 may be a haptic indicator, such as vibration provided to the virtual reality headset 200-C or a hand-held control unit or mouse device used for navigating the virtual reality computing environment 220.

In other specific embodiments of the invention, the authentication application 230 is configured such that a user 120 exiting an authenticated sub-environment 222 or falling out of contact with an authenticated virtual object 224 may communicate the known authentication to one or more members of a virtual reality network (e.g., family members, work colleagues, clients or the like) so that that the members of the virtual reality network have knowledge of the authentication and the authentication may persist for a predetermined period of time. Example, for the next 30 minutes the sub-environment 222 or specific virtual objects 224 in the sub-environment 222 are deemed to be authenticated.

Referring to FIG. 4, a flow diagram is presented of a method 300 for authentication of sub-environments and/or virtual objects in sub-environments of a virtual reality computing environment, in accordance with embodiments of the present invention. At Event 310, a virtual reality computing environment (otherwise referred to as the Metaverse and also including augmented reality computing environments) is presented to a user. The virtual reality computing environment includes one or more sub-environments, also referred to as zones, regions, sub-verses or bounded locations that represent a non-human entity, such as an organization, an agency, a business or the like. Additionally, the virtual reality computing environment includes one or more virtual objects (e.g., an avatar) located within a corresponding sub-environment that represents an individual associated with the entity.

At Event 320, at least one of (i) one or more sub-environments and (ii) one or more of the virtual objects in corresponding sub-environments are authenticated (i.e., verified as being the entity or verified as an individual representing the entity). As discussed above, the authentication means may include, but is not limited to, one or more of watermarks within images, such as logos, comparison of captured physical characteristics of an authorized entity representative to known/verified physical characteristics, cryptographic frequency signal hopping, electromagnetic signatures and the like.

In response to authenticating at least one of (i) one or more sub-environments and (ii) one or more of the virtual objects in corresponding sub-environments, at Event 330, one or more sensory-perceptible indicators are presented to the user that signify that a corresponding sub-environment or visual object in the corresponding sub-environment is authenticated. The sensory-perceptible indicators may be configured as visual indicators provided within the sub-environment or on or proximate to the virtual object, audible indicator that provide an audible signal when user enters the sub-environment or comes in close contact of the virtual object or haptic indicators that provide for vibration or the like at a virtual reality headset or a hand-held control unit or mouse device.

Thus, present embodiments of the invention discussed in detail above, provide for authentication/verification of sub-environments that represent entities within an augmented/virtual reality computing network and virtual objects present in the sub-environments that represent individuals associated with the entity. In response to authentication, a sensory-perceptible indicator (e.g., visual, audible or haptic indicators) is presented to users of the virtual reality computing environment that notify the user that the entity or virtual objects representing the entity have been authenticated. Authentication may be performed via watermarks embedded in images present within the sub-environment, capturing and comparing physical characteristics of an authorized individual representing the entity, cryptographic frequency hopping and/or electromagnetic signatures.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing authentication in a virtual reality computing environment, the system comprising:
    a computing platform including a memory and one or more computing processor devices in communication with the memory, wherein the memory stores:
    a virtual reality application executable by at least one of the one or more computing processor devices and configured to:
        present a virtual reality computing environment that includes at least one sub-environment representing a corresponding entity that is non-human and one or more virtual objects in the least one sub-environment, each virtual object representing a corresponding first individual associated with the corresponding entity; and
    an authentication application executable by at least one of the one or more computing processor devices and configured to:
    authenticate at least one of (i) one or more of the sub-environments and (ii) one or more of the virtual objects in the one or more of the sub-environments by:
        embedding a watermark in an image displayed (i) within the one or more of the sub-environments, or (ii) on or proximate to the one or more virtual objects, and
        communicating the watermark to an authenticating entity that verifies that the watermark is currently associated with a corresponding sub-environment or a corresponding virtual object in the one or more of the sub-environments, and
    in response to authenticating the at least one of the one or more of the sub-environments and the one or more of the virtual objects in the one or more of the sub-environments, present one or more first sensory-perceptible indicators that signify to a user of the virtual reality application that at least one of (i) the one or more of the sub-environments are authenticated as representing the entity, and (ii) one or more of the virtual objects in the one or more of the sub-environments are authenticated as representing a corresponding first individual associated with the entity.

2. The system of claim 1, wherein the authentication application is further configured to authenticate the at least one of (i) the one or more of the sub-environments and (ii) the one or more of the virtual objects in the one or more of the sub-environments by:
    embedding the watermark in the image displayed (i) within the one or more of the sub-environments or (ii) on or proximate to the one or more virtual objects,
    continuously changing the watermark in the image on a predetermined schedule,
    in response to changing the watermark, communicating the changed watermark to the authenticating entity that verifies that the changed watermark is currently associated with a corresponding sub-environment or a corresponding virtual object in the one or more of the sub-environments.

3. The system of claim 1, wherein the authentication application is configured to authenticate by: embedding the watermark in the image displayed (i) within the one or more of the sub-environments or (ii) on or proximate to the one or more virtual objects, wherein the watermark is visually-perceptible by the user, communicating the watermark to an authenticating entity, wherein the authenticating entity is the user.

4. The system of claim 1, wherein the authentication application is further configured to authenticate the at least one of (i) the one or more of the sub-environments and (ii) the one or more of the virtual objects in the one or more of the sub-environments by: embedding the watermark in the image displayed (i) within the one or more of the sub-environments or (ii) on or proximate to the one or more virtual objects, and generating random steganography and embedding the random steganography in the watermark.

5. The system of claim 1, wherein the authentication application is further configured to authenticate the at least one of (i) the one or more of the sub-environments and (ii) the one or more of the virtual objects in the one or more of the sub-environments by: embedding the watermark in the image displayed (i) within the one or more of the sub-environments or (ii) on or proximate to the one or more virtual objects, wherein the image is logo associated with the entity.

6. The system of claim 1, wherein the authentication application is further configured to authenticate the at least one of (i) the one or more of the sub-environments and (ii) the one or more of the virtual objects in the one or more of the sub-environments by:
   capturing physical characteristic data from at least one of (i) a second individual authorized to represent the entity or (ii) the first individual associated with the entity as represented by a corresponding one of the virtual objects, and
   comparing the captured physical characteristic data to verified physical characteristic data associated with the second individual or the first individual.

7. The system of claim 6, wherein the authentication application is further configured to authenticate the at least one of (i) the one or more of the sub-environments and (ii) the one or more of the virtual objects in the one or more of the sub-environments by:
   continuously capturing, throughout a user's virtual reality session, physical characteristic data from at least one of (i) a second individual authorized to represent the entity or (ii) the first individual associated with the entity as represented by a corresponding one of the virtual objects, and
   continuously comparing the captured physical characteristic data to verified physical characteristic data associated with the second individual or the first individual.

8. The system of claim 1, wherein the authentication application is further configured to:
   in response to the user interacting with one of the sub-environments that has not been authenticated or a virtual object in one of the sub-environments that has not been authenticated, present one or more second sensory-perceptible indicators that signify to a user at least one of (i) that the one of the sub-environments has not been authenticated, and (ii) that the virtual object in the one of the sub-environments has not been authenticated.

9. The system of claim 1, wherein the authentication application is further configured to authenticate the at least one of (i) the one or more of the sub-environments and (ii) the one or more of the virtual objects in the one or more of the sub-environments by:
   assigning cryptographic frequency hopping signals between the one or more of the sub-environments or the one or more of the virtual objects in the one or more of the sub-environments and the user.

10. The system of claim 1, wherein the authentication application is further configured to authenticate the at least one of (i) the one or more of the sub-environments and (ii) the one or more of the virtual objects in the one or more of the sub-environments by:
    generating an electromagnetic signature associated with at least one of (i) the one or more of the sub-environments and (ii) the one or more of the virtual objects in the one or more of the sub-environments, and
    communicating the electromagnetic signature to the user, wherein the user accesses a database that stores verified electromagnetic signatures associated with at least one of the sub-environments and the virtual objects in the sub-environment to compare the electromagnetic signature to the verified electromagnetic signatures stored in the database.

11. The system of claim 1, wherein the authentication application is further configured to communicate an authentication indicator to other users of the virtual reality computing environment that are associated with the user, wherein the authentication indicator serves to provide authentication to the other users, for a predetermined time period, that at least one of (i) the one or more of the sub-environments are authenticated as representing the entity, and (ii) one or more of the virtual objects in the one or more of the sub-environments are authenticated as representing a corresponding first individual associated with the entity.

12. A computer-implemented method for providing authentication in a virtual reality computing environment, the method executed by one or more computing processor devices and comprising:
    presenting a virtual reality computing environment that includes (i) at least one sub-environment representing a corresponding entity that is non-human and (ii) one or more virtual objects in the least one sub-environment, each virtual object representing a corresponding first individual associated with the corresponding entity;
    authenticating at least one of (i) one or more of the sub-environments and (ii) one or more of the virtual objects in the one or more of the sub-environments by:
      embedding a watermark in an image displayed (i) within the one or more of the sub-environments, or (ii) on or proximate to the one or more virtual objects, and
      communicating the watermark to an authenticating entity that verifies that the watermark is currently associated with a corresponding sub-environment or a corresponding virtual object in the one or more of the sub-environments; and
    in response to authenticating the at least one of (i) the one or more of the sub-environments and (ii) the one or more of the virtual objects in the one or more of the sub-environments, presenting one or more first sensory-perceptible indicators that signify to a user of the virtual reality computing environment that at least one of (i) the one or more of the sub-environments are authenticated as representing the entity, and (ii) one or more of the virtual objects in the one or more of the sub-environments are authenticated as representing a corresponding first individual associated with the entity.

13. The computer-implemented method of claim 12, further comprising:
continuously changing the watermark in the image on a predetermined schedule; and
in response to changing the watermark, communicating the changed watermark to the authenticating entity that verifies that the changed watermark is currently associated with a corresponding sub-environment or a corresponding virtual object in the one or more of the sub-environments.

14. The computer-implemented method of claim 12, wherein authenticating the at least one of (i) the one or more of the sub-environments and (ii) the one or more of the virtual objects in the one or more of the sub-environments further comprises:
capturing physical characteristic data from at least one of (i) a second individual authorized to represent the entity or (ii) the first individual associated with the entity as represented by a corresponding one of the virtual objects; and
comparing the captured physical characteristic data to verified physical characteristic data associated with the second individual or the first individual.

15. A computer program product comprising:
a non-transitory computer-readable medium comprising sets of codes for causing one or more computing processing devices to:
present a virtual reality computing environment that includes (i) at least one sub-environment representing a corresponding entity that is non-human and (ii) one or more virtual objects in the least one sub-environment, each virtual object representing a corresponding first individual associated with the corresponding entity;
authenticate at least one of (i) one or more of the sub-environments and (ii) one or more of the virtual objects in the one or more of the sub-environments by:
embedding a watermark in an image displayed (i) within the one or more of the sub-environments, or (ii) on or proximate to the one or more virtual objects, and
communicating the watermark to an authenticating entity that verifies that the watermark is currently associated with a corresponding sub-environment or a corresponding virtual object in the one or more of the sub-environments; and
in response to authenticating the at least one of (i) the one or more of the sub-environments and (ii) the one or more of the virtual objects in the one or more of the sub-environments, present one or more first sensory-perceptible indicators that signify to a user of the virtual reality computing environment that at least one of (i) the one or more of the sub-environments are authenticated as representing the entity, and (ii) one or more of the virtual objects in the one or more of the sub-environments are authenticated as representing a corresponding first individual associated with the entity.

16. The computer program product of claim 15, wherein the set of codes for causing the one or more computing processing devices to authenticate the at least one of (i) the one or more of the sub-environments and (ii) the one or more of the virtual objects in the one or more of the sub-environments further cause the one or more computing processing devices to:
continuously change the watermark in the image on a predetermined schedule; and
in response to changing the watermark, communicate the changed watermark to the authenticating entity that verifies that the changed watermark is currently associated with a corresponding sub-environment or a corresponding virtual object in the one or more of the sub-environments.

17. The computer program product of claim 15, wherein the set of codes for causing the one or more computing processing devices to authenticate the at least one of (i) the one or more of the sub-environments and (ii) the one or more of the virtual objects in the one or more of the sub-environments further cause the one or more computing processing devices to:
capture physical characteristic data from at least one of (i) a second individual authorized to represent the entity or (ii) the first individual associated with the entity as represented by a corresponding one of the virtual objects; and
compare the captured physical characteristic data to verified physical characteristic data associated with the second individual or the first individual.

* * * * *